2,773,770

FEEDS CONTAINING ANIMAL PROTEIN FACTORS, VITAMIN $B_{12}$ AND OTHER GROWTH-PROMOTING FACTORS

Bunro Maki, Tokyo, and Ikuo Ushikoshi, Chiba-ken, Japan; said Ushikoshi assignor to said Maki No Drawing. Application December 7, 1951,
Serial No. 260,544

1 Claim. (Cl. 99—9)

The present invention relates to the manufacture of dried and pulverized feeds for livestock, which feeds contain animal protein factors, vitamin $B_{12}$ and other growth-promoting factors produced by cultivating molds on vegetable solid or semi-solid media.

The invention is primarily concerned with the manufacture of feeds for domestic animals and fowls by (1) culturing molds on the aforesaid media so as to obtain the animal protein factors, vitamin $B_{12}$ and other growth-promoting factors in large amounts, and by (2) simple drying and pulverizing treatments of the media in toto without extracting, concentrating or adding the effective substances. The amount of the effective substances produced in the media on which the molds are grown is so large and concentrated that a small quantity of the feeds thus prepared, when mixed with ordinary feeds, is sufficient in promoting and accelerating growth of livestock. Thus, the media themselves effectively serve as concentrated feeds for livestock.

It is a well-known fact that animal protein contains a growth-promoting factor not found in vegetable protein. This substance is known as the animal protein factor. Since Rockes and Smith found vitamin $B_{12}$ in liver in 1948 it has been regarded as a principal part, if not the whole, of animal protein factor. Later it was found that various microorganisms, especially streptomyces produce a large amount of vitamin $B_{12}$. It is isolated from culture liquids of such organisms in crystaline form and is used clinically in the treatment of malignant anemia. On the other hand, the wastes of culture media for Streptomyces and Penicillium are used as feeds for livestocks extensively.

It has been thought that since vitamin $B_{12}$ production of molds is insignificant, they have no practical value and, in fact, they have been disregarded in the United States. We found, however, by quantitative assaying that certain types of molds produce a fairly large amount of vitamin $B_{12}$; especially when a solid medium is used, vitamin $B_{12}$ is produced in quantity many times more in comparison with a liquid medium under the most suitable conditions. As a result of the decomposition of media by mold enzymes, agreeable odor and taste, which rouse appetite of animals, are produced. This is distinctly in contrast with the disagreeable smell of the waste of Streptomyces culture.

The present invention provides a simple process for the manufacture of feeds as hereinafter described, with special advantages due to the adoption of solid media or semi-solid media and the omission of any step of extraction or concentration of the animal protein factors and other growth-promoting factors.

The process of manufacture of the feeds is as follows:
One or several kinds of the following raw materials are used for culture media of molds, namely, cereals, rice or wheat bran, corn flour or lees, peanut husk, starch, starch lees and fermentation lees. A mixture of these materials is made into a porous solid medium. If desired, a solution of carbohydrate, nitrogenous substance and inorganic salts may be added in appropriate quantities. Addition of a minute quantity of cobalt salt enhances production of vitamin $B_{12}$. This mixture is sterilized with steam and placed in an incubator provided with a device to supply compressed air through compress tank or it is spread over a hurdle so as to get a sufficient air supply. Then a pure culture of molds is seeded over the medium and incubated for three to seven days at an appropriate temperature of 32 to 36 degrees centigrade. After a period of incubation, the medium is taken out and dried at a low temperature and pulverized.

The material thus prepared contains vitamin $B_{12}$ and other substances which also accelerate the growth of animals, and a certain amount of antibiotic substances. This preparation does not contain any toxic substance. It contains savory proteids, appears to be tasty to animals fed with it and promotes appetite. The pulverized material thus prepared by itself constitutes a concentrated feed and, particularly when it is mixed with ordinary vegetable feed to an extent of two to ten percent by weight, acceleration of growth of livestock is greatly increased.

The livestock feeds prepared according to our invention as described above contains:

1. Vitamin $B_{12}$ 20 mcg.–35 mcg. per 100 grams
2. Certain quantity of sex stimulating hormones
3. Certain quantity of antibiotics In raising young chickens with the feeds prepared according to this invention mixed with ordinary vegetable feeds, the adult stage is attained in a shorter time and the hens begin to lay eggs about twenty to twenty-three days earlier than hens raised with ordinary vegetable feeds alone. The rates of fertilization and hatching of eggs are increased by ten to twenty percent. The number of eggs laid per hen in a unit period of time is greatly increased by shortening the periods of sitting on eggs. When a hen sits on eggs she leaves the nest in about three days and begins to lay eggs again. If an old hen, which shows decrease in egg-laying activity, is fed with the feed according to this invention, the rate of laying eggs is increased by twenty percent. Similarly if a young adult hen is fed with the said feed during summer and winter seasons when egg laying is at the lowest ebb, the rate of laying eggs is increased by thirty percent.

If hogs are fed with the feed prepared according to our invention beginning at the time of weaning, the body weight of the animals at the end of two months is greater by thirty percent than that of a group of control animals fed with ordinary feed.

The feeding of adult male chickens with feeds according to the present invention produces enlargement and reddening of the cocks' combs thereof, and in hogs, the growth of uncastrated males and of females is greatly accelerated in comparison with castrated hogs.

The media or the feeds prepared according to this invention as aforedescribed contain vitamin $B_{12}$ and other effective substances. The vitamin $B_{12}$ potency is determined quantitatively and qualitatively by microbiological methods of assaying with Lactobacillus lactis Dorner or Lactobacillus leichmanni or with Euglena gracillis var. bacillaris. As standard comparison Merck's crystalline vitamin $B_{12}$ solution is used.

The microbiological assay always shows somewhat higher values due to its response to substances other than vitamin $B_{12}$. To differentiate true value from apparent assay values we used two methods. The first method is an alkali treatment of the samples. When the samples are boiled for 30 minutes in alkali medium the activity of vitamin $B_{12}$ is completely destroyed, while other active substances remain intact. The difference in the values thus obtained before and after the treatment is the true vitamin $B_{12}$ value. The second method is the use of the paper chromatography. While vitamin $B_{12}$ is not transported from the original point, the other active substances travel far up on the paper with a solvent such as butanol. Using these two methods, we verified that almost all the active substances produced by the molds are true vitamin $B_{12}$. The true vitamin $B_{12}$ value in the media cultured with molds as aforedescribed is 10–25 micrograms per one hundred grams of the dried sample.

The manufacture of the feeds according to this invention involves two important features, namely: (1) selection of suitable genera of molds which produce as large an amount of vitamin $B_{12}$ as possible, the production of vitamin $B_{12}$ varying greatly according to different genera and even different strains of the same genera; and (2) preparation of solid or semisolid media consisting of ingredients suitable for vigorous growth of molds and for production of vitamin $B_{12}$. What might ordinarily be regarded as rich media may not necessarily be the most suitable media for the growth of the molds or for the production of vitamin $B_{12}$. The raw materials mentioned before were found to be best suited for the purpose.

1. The preferred variety of mold are as follows:

Neurospora genera (for example, *N. crassa*)
Rhizopus genera (for example, *Rh. nigricans*)

2. Constituents of the raw material for media:

In order to supply sufficient nutrition and to make porous media, which provides a suitable environment for the growth of the molds, the following raw materials are preferably mixed. The proportion of each ingredient, however, may be varied and only one or several of the ingredients need be used. Starch, corn or bean flour are, however, indispensable sources of nutrition and some of them must always be added in the media.

An example of a medium is as follows:

| Ingredient | Amount |
|---|---|
| Wheat bran | percent by weight 50 |
| Corn flour | do 10 |
| Bean flour | do 5 |
| Lees of starch (some starch is included) | do 25 |
| Rice bran | do 10 |
| Corn juice | do 1–10 |
| Cobalt salt | parts per million 1–100 |

The foregoing ingredients are mixed and then sterilized with steam and spread over the shelves or on a hurdle in the incubator in a thickness of five to ten centimeters. A medium thus prepared is now ready for seeding of pure culture of molds.

Following are further illustrative examples of embodiments according to this invention:

*Example 1*

A pure culture of *Oospora lupli* on agar medium is seeded on wheat bran moistened with corn juice and incubated at a temperature of 32 to 36 degrees centigrade for several days. When the organisms have multiplied sufficiently, the entire culture is seeded over a sterilized mixture of the ingredients described above. After three to five days the mixture is dried at a temperature of 30 to 120 degrees centigrade and pulverized. The powder thus prepared contains 10–15 micrograms of vitamin $B_{12}$ per 100 grams of the preparation. In actual feeding of livestock the pulverized preparation is added to an ordinary feed in a rate of two to ten percent by weight.

*Example 2*

The raw materials used and preparation of the medium are the same as described in the Example 1.

A pure culture of *Neurospora crassa* on wheat bran is seeded over a sterilized mixture of the ingredients described before. After an incubation of a few days the second seeding of a pure culture of *Rhyzopus nigricans* on wheat bran is made and incubated for two to four days more. Finally, the mass is dried and pulverized and used as a concentrated feed. The content of vitamin $B_{12}$ in this preparation is between 15 to 30 micrograms.

Having thus disclosed the invention what is claimed is:

A method for the preparation of an all vegetable feed for livestock comprising essentially aerobically fermenting a solid vegetable medium, spread over a hurdle, said medium wetted with not more than about 10% by weight thereof of corn juice and inoculated with *Neurospora crossa* to form a growth promoting substance, said *Neurospora crossa* growing for about one to four days at a temperature of from about 20° C. to about 44° C., whereafter the medium is inoculated with *Rhizopus nigricans* and growth permitted for an additional period of time of at least about one day at a temperature of from about 20° C. to about 44° C., after which the medium is dried and pulverized.

References Cited in the file of this patent

UNITED STATES PATENTS

| Number | Name | Date |
|---|---|---|
| 2,256,914 | Whitcomb | Sept. 23, 1941 |
| 2,370,665 | Jeffreys | Mar. 6, 1945 |
| 2,396,234 | Allen et al. | Mar. 12, 1946 |
| 2,450,318 | Wagamon | Sept. 28, 1948 |
| 2,452,534 | Jeffreys | Nov. 2, 1948 |
| 2,515,135 | Petty | July 11, 1950 |
| 2,563,794 | Rickes | Aug. 17, 1951 |

OTHER REFERENCES

Wolf et al.: The Fungi, vol. II, page 83, John Wiley and Sons, New York, N. Y. (1947).